United States Patent
Matsuda

(10) Patent No.: US 8,067,720 B2
(45) Date of Patent: Nov. 29, 2011

(54) IMAGE SENSING DEVICE AND IMAGING SYSTEM

(75) Inventor: Takashi Matsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 12/477,499

(22) Filed: Jun. 3, 2009

(65) Prior Publication Data

US 2009/0302200 A1 Dec. 10, 2009

(30) Foreign Application Priority Data

Jun. 5, 2008 (JP) ................. 2008-148315

(51) Int. Cl.
*H01L 27/00* (2006.01)
*H03F 3/08* (2006.01)
*H04N 5/217* (2011.01)

(52) U.S. Cl. .......... 250/208.1; 250/214 A; 348/241

(58) Field of Classification Search ........ 250/208.1, 250/214 A, 214 AG, 214 R; 257/290–294; 348/222.1, 241, 294, 300–309
See application file for complete search history.

(56) References Cited

U.S. PATENT DOCUMENTS

| | | | |
|---|---|---|---|
| 6,650,369 B2 | 11/2003 | Koizumi et al. | 348/301 |
| 7,460,164 B2 | 12/2008 | Hyama et al. | 348/300 |
| 2002/0051067 A1* | 5/2002 | Henderson et al. | 348/241 |
| 2003/0137594 A1 | 7/2003 | Koizuma et al. | 348/308 |
| 2004/0201550 A1* | 10/2004 | Nakamura et al. | 345/55 |
| 2008/0174672 A1 | 7/2008 | Hiyama et al. | 348/222.1 |

FOREIGN PATENT DOCUMENTS

| | | |
|---|---|---|
| JP | 11-112018 A | 4/1999 |
| JP | 2005-217771 A | 8/2005 |
| JP | 2005-223860 A | 8/2005 |

* cited by examiner

*Primary Examiner* — Georgia Y Epps
*Assistant Examiner* — Renee Naphas
(74) *Attorney, Agent, or Firm* — Fitzpatrick, Cella, Harper & Scinto

(57) ABSTRACT

An image sensing device includes a pixel array, a plurality of column amplification units each including a setting unit, and a plurality of reference signal supply units. A first reference signal and a second reference signal are common to a plurality of columns in the pixel array. Each of the plurality of column amplification units amplifies the difference between the first reference signal and the second reference signal to output the amplified difference, or amplifies each of the first reference signal and the second reference signal to output the amplified first reference signal and the amplified second reference signal. The setting unit of each amplification unit sets an amplification factor which is determined in accordance with a signal output from each of the plurality of column amplification units so as to reduce variations of the amplification factor between the plurality of column amplification units.

7 Claims, 5 Drawing Sheets

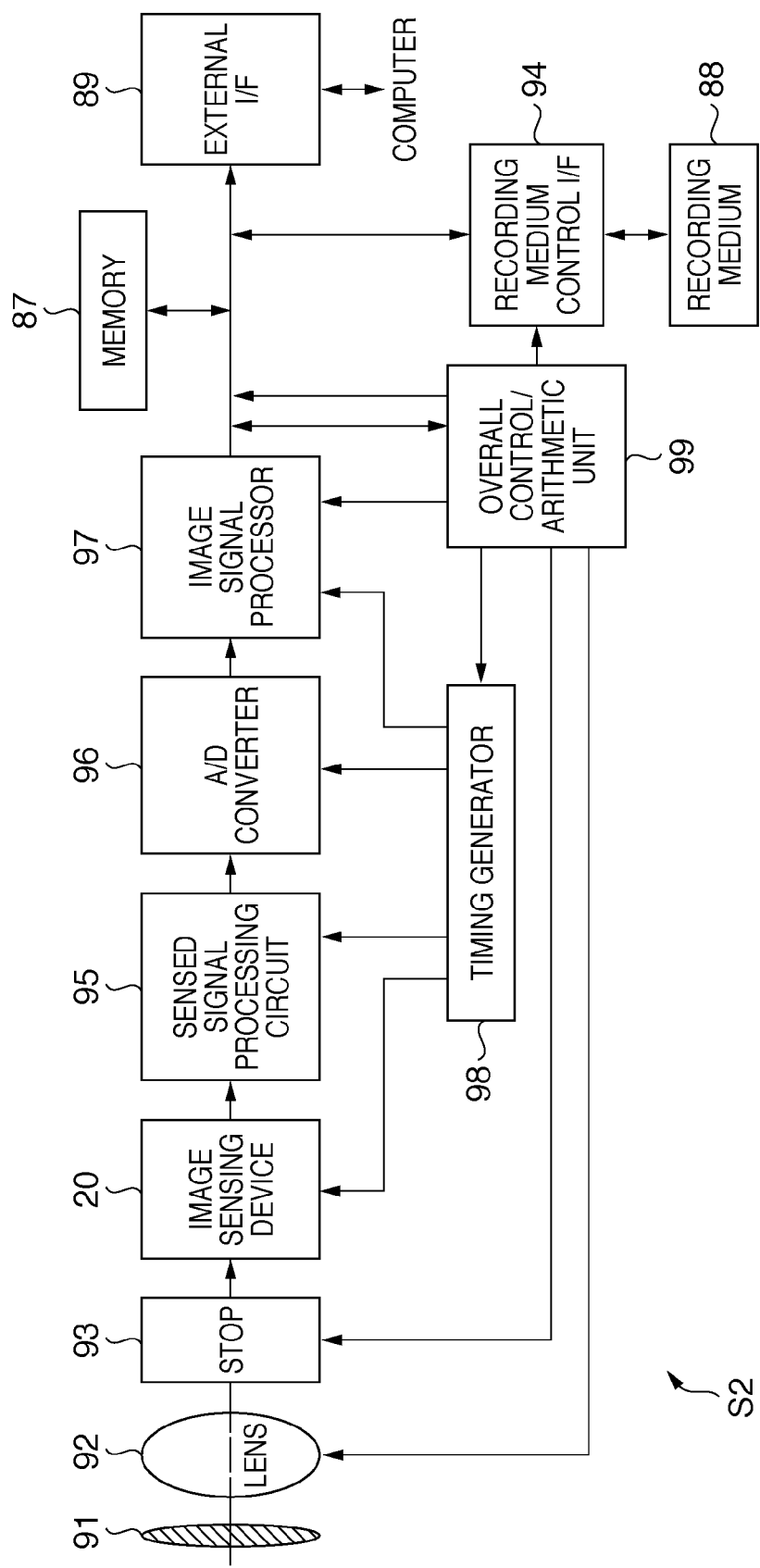

IMAGE SENSING DEVICE AND IMAGING SYSTEM

BACKGROUND OF THE INVENTION

1. Field of the Invention

The present invention relates to an image sensing device and imaging system.

2. Description of the Related Art

Some recent imaging systems such as a digital camera and a digital video camera adopt an image sensing device, such as a CMOS sensor, which has an active element in a pixel and allows formation of peripheral circuits on a single chip.

The CMOS sensor includes a pixel array. In the pixel array, a plurality of pixels are arrayed in directions along rows and columns. Each pixel includes a photodiode, a transfer MOS transistor, a floating diffusion (FD), a reset MOS transistor, and an amplification MOS transistor.

The photodiode generates and stores charges corresponding to light. The transfer MOS transistor transfers the charges generated in the photodiode to the FD. The FD converts the transferred charges into a voltage. The reset MOS transistor resets the FD. The amplification MOS transistor outputs an N signal corresponding to the voltage of the FD to a column signal line while the reset MOS transistor resets the FD. The amplification MOS transistor outputs an S signal corresponding to the voltage of the FD to the column signal line while the transfer MOS transistor transfers the charges of the photodiode to the FD.

The threshold voltage of the amplification MOS transistor varies between pixels. Further, the FD generates kTC noise (thermal noise) when the reset MOS transistor resets the FD. As a result, fixed pattern noise is mixed in N and S signals.

To reduce fixed pattern noise, in a technique disclosed in Japanese Patent Laid-Open No. 2005-223860, a CDS circuit on each column performs CDS processing to calculate the difference between N and S signals transferred from a pixel array via a column signal line, generating an image signal free from fixed pattern noise. In the technique disclosed in Japanese Patent Laid-Open No. 2005-223860, N and S signals are directly read out to calculate and hold the difference between them. In this technique, when the difference level is low, the S/N ratio of an obtained image signal may decrease.

To increase an S/N ratio, in a technique disclosed in Japanese Patent Laid-Open No. 2005-217771, a clamp capacitor and an operational amplifier on each column execute CDS processing to amplify the difference between N and S signals transferred from a pixel array via a column signal line. According to the technique disclosed in Japanese Patent Laid-Open No. 2005-217771, because the difference is held after the difference is amplified, the S/N ratio of an obtained image signal can increase.

However, in the technique disclosed in Japanese Patent Laid-Open No. 2005-217771, when the amplification factor varies between a plurality of operational amplifiers (column amplification units), the levels of image signals output from these operational amplifiers may differ between them. Although this technique can reduce fixed pattern noise arising from variations of the characteristics between a plurality of pixels, the technique may not be able to reduce fixed pattern noise arising from variations of the amplification factor between a plurality of operational amplifiers. Especially at a high-sensitivity setting, streak noise may still stand out in an image obtained from an image signal.

SUMMARY OF THE INVENTION

The present invention reduces fixed pattern noise arising from variations of the amplification factor between a plurality of column amplification units.

According to the first aspect of the present invention, there is provided an image sensing device comprising: a pixel array in which a plurality of pixels are arrayed in a direction along a row and a direction along a column; a plurality of column amplification units each of which includes a setting unit for setting an amplification factor, and each of which amplifies, by an amplification factor set by the setting unit, the difference between a first signal and a second signal output at different timings from a pixel on a column in the pixel array to a column signal line or amplifies, by the amplification factor, each of the first signal and the second signal; and a plurality of reference signal supply units each of which outputs a first reference signal and a second reference signal to the column signal line at different timings. The first reference signal and the second reference signal are common to a plurality of columns in the pixel array. Each of the plurality of column amplification units amplifies the difference between the first reference signal and the second reference signal to output the amplified difference, or amplifies each of the first reference signal and the second reference signal to output each of the amplified first reference signal and the amplified second reference signal. Each setting unit sets, in its column amplification unit, an amplification factor which is determined in accordance with a signal output from each of the plurality of column amplification units so as to reduce variations between the amplification factors of the plurality of column amplification units.

According to the second aspect of the present invention, there is provided an imaging system comprising: an image sensing device according to the first aspect of the present invention; an optical system which forms an image on an image sensing surface of the image sensing device; and a signal processing unit which processes a signal output from the image sensing device to generate image data. Each of a plurality of column amplification units amplifies the difference between a first reference signal and a second reference signal to generate and output a first image signal. The signal processing unit controls each setting unit to receive the first image signal, determine an amplification factor of each of the plurality of column amplification units in accordance with the received first image signals so as to reduce variations between the amplification factors of the plurality of column amplification units, and set the determined amplification factor. Each of the plurality of column amplification units amplifies the difference between the first reference signal and the second reference signal at the amplification factor set by its setting unit under the control of the signal processing unit to generate and output a second image signal.

According to the third aspect of the present invention, there is provided an imaging system comprising: an image sensing device according to the first aspect of the present invention; an optical system which forms an image on an image sensing surface of the image sensing device; and a signal processing unit which processes a signal output from the image sensing device to generate image data. Each of a plurality of column amplification units amplifies a first reference signal and a second reference signal to output the amplified first reference signal and the amplified second reference signal. The signal processing unit receives the amplified first reference signal and the amplified second reference signal, generates a first image signal by calculating the difference between the received amplified first reference signal and the received amplified second reference signal, determines an amplification factor of each of the plurality of column amplification units in accordance with the generated first image signal so as to reduce variations between the amplification factors of the plurality of column amplification units, and controls each setting unit to set the determined amplification factor. Each of the plurality of column amplification units amplifies a first signal and a second signal at the amplification factor set by the setting unit under the control of the signal processing unit to output the amplified first signal and the amplified second signal. The signal processing unit receives the amplified first signal and the amplified second signal to calculate the difference between the amplified first signal and the amplified second signal to generate a second image signal.

The present invention can reduce fixed pattern noise arising from variations between the amplification factors of a plurality of column amplification units.

Further features of the present invention will become apparent from the following description of exemplary embodiments with reference to the attached drawings.

BRIEF DESCRIPTION OF THE DRAWINGS

FIG. 5 is a block diagram showing another example of the arrangement of an imaging system S2 according to the embodiment of the present invention.

DESCRIPTION OF THE EMBODIMENT

Figure 1:
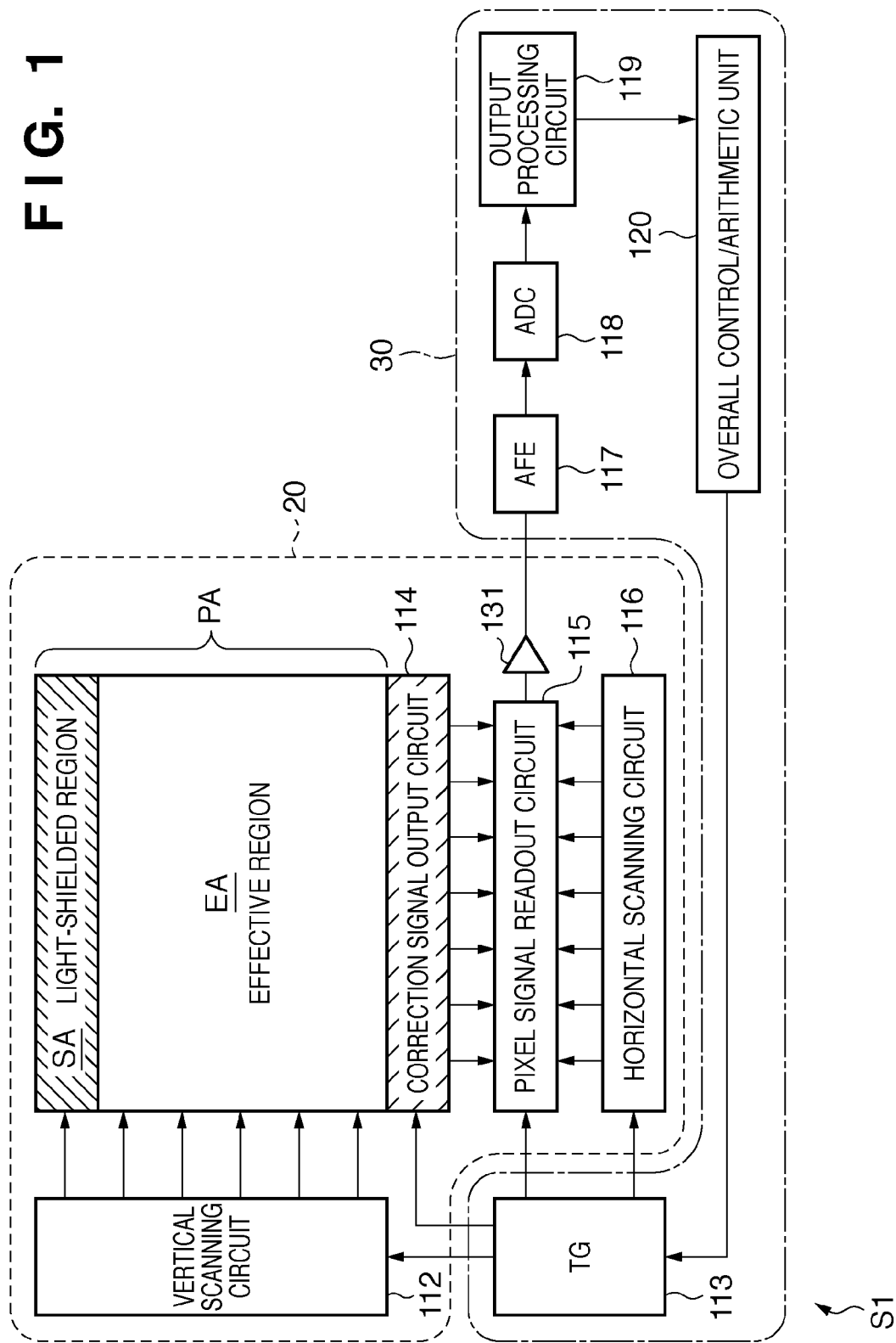
FIG. 1 is a block diagram showing an example of the arrangement of an imaging system S1 according to an embodiment of the present invention.

An imaging system S1 according to an embodiment of the present invention will be described with reference to FIG. 1. FIG. 1 is a block diagram showing an example of the arrangement of the imaging system S1 according to the embodiment of the present invention.

The imaging system S1 is, for example, a digital camera or a digital video camera. The imaging system S1 includes an optical system (not shown), an image sensing device 20, and a signal processing unit 30.

The optical system forms an image on the image sensing surface (a pixel array PA) of the image sensing device 20.

The image sensing device 20 converts an object image formed on the pixel array PA into an image signal. The image sensing device 20 outputs the converted image signal. The image sensing device 20 is, for example, a CMOS sensor.

The signal processing unit 30 processes a signal output from the image sensing device 20 to generate image data. The signal processing unit 30 controls the optical system and image sensing device 20 in accordance with the generated image data.

Figure 2:
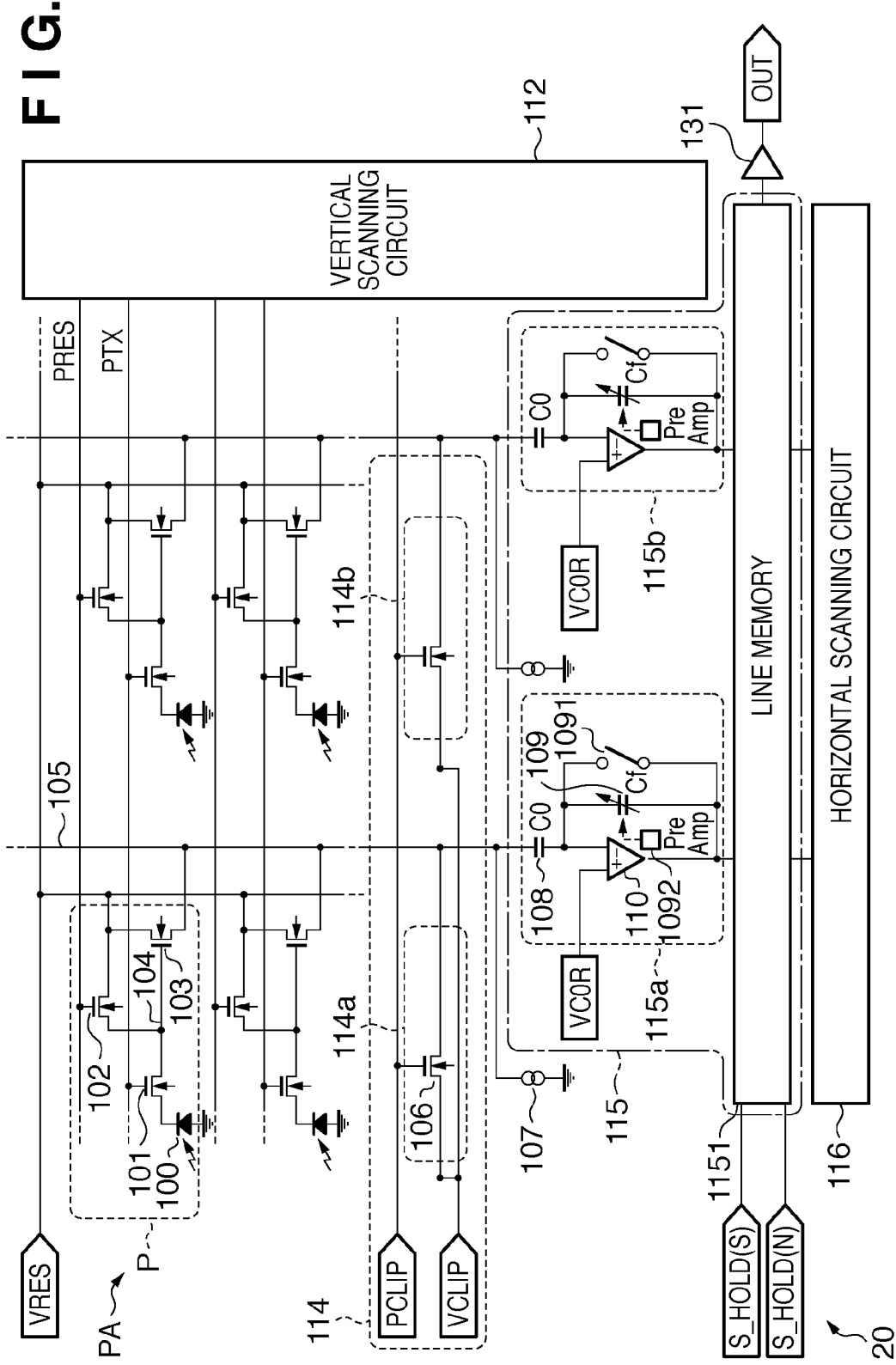
FIG. 2 is a diagram showing the circuit arrangement of an image sensing device 20.

The arrangement of the image sensing device 20 will be explained with reference to FIGS. 1 and 2. FIG. 2 is a diagram showing the circuit arrangement of the image sensing device 20.

The image sensing device 20 includes the pixel array PA, a vertical scanning circuit 112, a correction signal output circuit 114, a pixel signal readout circuit 115, a horizontal scanning circuit 116, and an output circuit 131.

In the pixel array PA, a plurality of pixels P are arrayed in directions along rows and columns. The pixel array PA includes a light-shielded region SA and effective region EA. In the light-shielded region SA, light-shielded pixels are arranged. In the effective region EA, pixels not shielded from light are arranged. The signal processing unit 30 subsequent to the image sensing device 20 uses a signal output from a pixel in the light-shielded region SA to correct the black level of a signal output from a pixel in the effective region EA. Pixels in the light-shielded region SA and those in the effective region EA have the same structure.

FIG. 2 exemplifies the effective region EA made up of 2×2 pixels P. FIG. 2 does not show the light-shielded region SA.

Each pixel P includes a photoelectric conversion unit 100, a transfer unit 101, a charge-voltage conversion unit 104, a reset unit 102, and an output unit 103.

The photoelectric conversion unit 100 generates and stores charges corresponding to light. The photoelectric conversion unit 100 is, for example, a photodiode.

Upon receiving an active-level signal from the vertical scanning circuit 112, the transfer unit 101 transfers charges generated in the photoelectric conversion unit 100 to the charge-voltage conversion unit 104. The transfer unit 101 is, for example, a transfer MOS transistor. Upon receiving an active-level signal at the gate from the vertical scanning circuit 112, the transfer unit 101 is turned on to transfer the charges of the photoelectric conversion unit 100 to the charge-voltage conversion unit 104.

The charge-voltage conversion unit 104 converts the transferred charges into a voltage. The charge-voltage conversion unit 104 also functions as the input of the output unit 103, and inputs a signal corresponding to the voltage to the output unit 103. The charge-voltage conversion unit 104 is, for example, a floating diffusion region.

Upon receiving an active-level signal from the vertical scanning circuit 112, the reset unit 102 resets the charge-voltage conversion unit 104. Similar to a circuit arrangement described in Japanese Patent Laid-Open No. 11-112018, the reset unit 102 selects or deselects a pixel by controlling the potential of the charge-voltage conversion unit 104.

The reset unit 102 selects the pixel P by resetting the potential of the charge-voltage conversion unit 104 to a first potential VRESH. The first potential VRESH is a potential to turn on the output unit (amplification MOS transistor) 103. At this time, the potential of a power supply VRES is controlled such that it is the first potential VRESH.

The reset unit 102 deselects the pixel P by resetting the potential of the charge-voltage conversion unit 104 to a second potential VRESL. The second potential VRESL is a potential to turn off the output unit (amplification MOS transistor) 103. At this time, the potential of the power supply VRES is controlled such that it is the second potential VRESL.

The reset unit 102 is, for example, a reset MOS transistor. Upon receiving an active-level signal at the gate from the vertical scanning circuit 112, the reset unit 102 is turned on to reset the charge-voltage conversion unit 104. The gate of the reset unit 102 receives an active-level signal which is a signal of a potential higher than the first potential VRESH by a threshold voltage or more.

The output unit 103 outputs a signal corresponding to the voltage of the charge-voltage conversion unit 104 to a column signal line 105. The output unit 103 outputs the first signal (noise signal) to the column signal line 105 while the reset unit 102 resets the charge-voltage conversion unit 104. The output unit 103 outputs the second signal (optical signal) to the column signal line 105 while the transfer unit 101 transfers the charges of the photoelectric conversion unit 100 to the charge-voltage conversion unit 104. The output unit 103 is, for example, an amplification MOS transistor. The output unit 103 performs a source follower operation together with a constant current source 107 connected to the column signal line 105, outputting a signal corresponding to the voltage of the charge-voltage conversion unit 104 to the column signal line 105.

The vertical scanning circuit 112 vertically scans the respective rows of the pixel array PA to select a predetermined row in the pixel array PA and drive the selected row.

The correction signal output circuit 114 includes reference signal supply units 114a and 114b. The reference signal supply units 114a and 114b are connected to pixels on respective columns in the pixel array PA via the column signal lines 105. The reference signal supply units 114a and 114b on the respective columns output a first reference signal VCLIPH and second reference signal VCLIPL to the column signal lines 105 at different timings. The first reference signal VCLIPH and second reference signal VCLIPL are common to a plurality of columns in the pixel array PA respectively.

The internal arrangement of the reference signal supply units 114a and 114b on respective columns will be described later.

The pixel signal readout circuit 115 includes column amplification units (column amplifiers) 115a and 115b, and a line memory 1151. The column amplification units 115a and 115b are connected via the column signal lines 105 to pixels on respective columns in the pixel array PA and the reference signal supply units 114a and 114b on the respective columns.

The column amplification units 115a and 115b on the respective columns output their offsets as first N signals to the line memory 1151. The column amplification units 115a and 115b on the respective columns receive the first reference signal VCLIPH and second reference signal VCLIPL output from the reference signal supply units 114a and 114b on corresponding columns to the column signal lines 105 at different timings. The column amplification units 115a and 115b on the respective columns perform CDS processing to amplify the difference between the first reference signal VCLIPH and the second reference signal VCLIPL. As a result, the column amplification units 115a and 115b on the respective columns generate first image signals. The column amplification units 115a and 115b output, to the line memory 1151, first S signals obtained by superposing the offsets of the column amplification units 115a and 115b on the first image signals. The line memory 1151 holds the first N signals and first S signals of pixels on the respective columns.

The column amplification units 115a and 115b on the respective columns output their offsets as second N signals to the line memory 1151. The column amplification units 115a and 115b on the respective columns receive first and second signals output from pixels on a selected row to the column signal lines 105 at different timings. The column amplification units 115a and 115b on the respective columns perform CDS processing to amplify the differences between the first and second signals. As a result, the column amplification units 115a and 115b on the respective columns generate second image signals. The column amplification units 115a and 115b output, to the line memory 1151, second S signals obtained by superposing the offsets of the column amplification units 115a and 115b on the second image signals. The line memory 1151 holds the second N signals and second S signals of pixels on the respective columns.

The internal arrangement of the column amplification units 115a and 115b on the respective columns will be described later.

The horizontal scanning circuit 116 horizontally scans the pixel signal readout circuit 115 to sequentially transfer, to the output circuit 131, the first S signal and first N signal of the pixel on each column that are held in the line memory 1151 of the pixel signal readout circuit 115.

The horizontal scanning circuit 116 horizontally scans the pixel signal readout circuit 115 to sequentially transfer, to the output circuit 131, the second S signal and second N signal of the pixel on each column that are held in the line memory 1151 of the pixel signal readout circuit 115.

The output circuit 131 calculates the difference between the transferred first S signal and first N signal, obtaining a first image signal free from the offset of the column amplification unit (operational amplifier to be described later). The output circuit 131 outputs the first image signal to an analog front end (AFE) 117 (to be described later).

The output circuit 131 calculates the difference between the transferred second S signal and second N signal, obtaining a second image signal free from the offset of the column amplification unit (operational amplifier to be described later). The output circuit 131 outputs the second image signal to the AFE 117 (to be described later).

The arrangement of the signal processing unit 30 will be explained with reference to FIG. 1.

The signal processing unit 30 includes the AFE 117, an A/D converter (ADC) 118, an output processing circuit 119, an overall control/arithmetic unit 120, and a timing generator (TG) 113.

The AFE 117 receives the first image signal from the image sensing device 20. The AFE 117 performs predetermined processing such as amplification processing for the first image signal, and outputs the processed first image signal to the ADC 118.

The AFE 117 receives the second image signal from the image sensing device 20. The AFE 117 executes predetermined processes such as amplification processing and OB clamp processing for the second image signal. In the OB clamp processing, the AFE 117 uses a signal output from a pixel in the light-shielded region SA to correct the black level of a signal (second image signal) output from a pixel in the effective region EA. The AFE 117 outputs the processed second image signal to the ADC 118.

The ADC 118 receives the first image signal from the AFE 117. The ADC 118 A/D-converts the received first image signal (analog signal), generating a first image signal (digital signal). The ADC 118 outputs the generated first image signal (digital signal) to the output processing circuit 119.

The ADC 118 receives the second image signal from the AFE 117. The ADC 118 A/D-converts the received second image signal (analog signal), generating a second image signal (digital signal). The ADC 118 outputs the generated second image signal (digital signal) to the output processing circuit 119.

The output processing circuit 119 receives the first image signal (digital signal) from the ADC 118. The output processing circuit 119 executes various arithmetic processes such as correction for the first image signal (digital signal), generating reference image data. The output processing circuit 119 determines the amplification factors of the column amplification units 115a and 115b in accordance with the reference image data so as to reduce variations of the amplification factor between the column amplification units 115a and 115b. The output processing circuit 119 supplies information on the determined amplification factors to the overall control/arithmetic unit 120.

The output processing circuit 119 also receives the second image signal (digital signal) from the ADC 118. The output processing circuit 119 performs various arithmetic processes such as correction for the second image signal (digital signal), generating display or recording image data. The output processing circuit 119 supplies the display or recording image data to the overall control/arithmetic unit 120.

The overall control/arithmetic unit 120 receives the information on the determined amplification factors from the output processing circuit 119. The overall control/arithmetic unit 120 controls the TG 113 in accordance with the determined amplification factors.

The overall control/arithmetic unit 120 receives the display or recording image data from the output processing circuit 119. The overall control/arithmetic unit 120 controls the respective units to display an image corresponding to the display image data on a display unit (not shown). The overall control/arithmetic unit 120 controls the respective units to record the recording image data on a recording medium (not shown).

The TG 113 supplies driving signals to the vertical scanning circuit 112, the correction signal output circuit 114, the pixel signal readout circuit 115, and the horizontal scanning circuit 116 in the image sensing device 20 under the control of the overall control/arithmetic unit 120.

For example, the TG 113 supplies driving signals corresponding to the determined amplification factors to the pixel signal readout circuit 115, controlling the column amplification units 115a and 115b to amplify the differences between the first and second signals at the determined amplification factors. As a result, the column amplification units 115a and 115b on respective columns generate second image signals by amplifying the differences between the first and second signals at the amplification factors which are determined in accordance with first image signals so as to reduce variations of the amplification factor between a plurality of column amplification units.

The arrangement of the column amplification unit will be explained with reference to FIG. 2. Although the arrangement of the column amplification unit 115a will be exemplified, the column amplification unit 115b also has a similar arrangement to that of the column amplification unit 115a.

The column amplification unit 115a includes an input capacitor 108, a feedback capacitor 109, an operational amplifier 110, a reset switch 1091, and a setting unit 1092.

The input capacitor 108 includes first and second electrodes. The first electrode receives a signal transferred from the pixel P on each column in the pixel array PA or the reference signal supply unit 114a via the column signal line 105. The second electrode is configured to form a capacitor together with the first electrode and, for example, faces the first electrode. The second electrode is connected to the inverting input terminal of the operational amplifier 110.

The feedback capacitor 109 is connected to the inverting input terminal and output terminal of the operational amplifier 110. The feedback capacitor 109 is configured to feed back an output from the output terminal to inverting input terminal of the operational amplifier 110. The feedback capacitor 109 has a variable capacitance value.

The operational amplifier 110 receives the first and second reference signals from the reference signal supply unit 114a via the column signal line 105. The input capacitor 108 and operational amplifier 110 operate as a clamp circuit, which calculates the difference between the first and second reference signals, generating a first difference signal. The operational amplifier 110 amplifies the first difference signal at a predetermined amplification factor (inverting gain) corresponding to the capacitance ratio of the input capacitor 108 and feedback capacitor 109, generating a first image signal. That is, the operational amplifier 110 generates a first image signal by performing CDS processing to amplify the difference between the first and second reference signals.

The reset switch 1091 is connected to the inverting input terminal and output terminal of the operational amplifier 110. When the reset switch 1091 is turned on, it short-circuits the output terminal and inverting input terminal of the operational amplifier 110 to reset the operational amplifier 110. Then, the operational amplifier 110 outputs its offset from its output terminal.

The setting unit 1092 controls the capacitance value of the feedback capacitor so that the amplification factor corresponding to the capacitor ratio of the input capacitor 108 and feedback capacitor 109 equals an amplification factor which is determined in accordance with the first image signal so as to reduce variations of the amplification factor between a plurality of column amplification units. That is, the setting unit 1092 controls the feedback capacitor to a capacitance value corresponding to an amplification factor which is determined in accordance with the first image signal so as to reduce variations of the amplification factor between a plurality of column amplification units. Then, the operational amplifier 110 amplifies an input signal at the determined amplification factor (inverting gain) corresponding to the ratio of the capacitance value of the input capacitor 108 and the controlled capacitance value of the feedback capacitor 109.

More specifically, the operational amplifier 110 receives first and second signals at different timings from the pixel P on each column in the pixel array PA via the column signal line 105. The operational amplifier 110 generates a second image signal by performing CDS processing to amplify the difference between the first and second signals at an amplification factor set by the setting unit 1092.

The arrangement of the reference signal supply unit will be explained with reference to FIG. 2. Although the arrangement of the reference signal supply unit 114a will be exemplified, the reference signal supply unit 114b also has the similar arrangement to that of the reference signal supply unit 114a.

The reference signal supply unit 114a includes a clipping MOS transistor 106. Upon receiving an active-level signal PCLIP at the gate from the TG 113, the clipping MOS transistor 106 is turned on to output, to its source, a predetermined reference signal VCLIP supplied to its drain.

Upon receiving the active-level signal PCLIP at the gate from the TG 113, the clipping MOS transistor 106 outputs the first reference signal VCLIPH to the column signal line 105 via its source at a timing when its drain receives the first reference signal VCLIPH.

Upon receiving the active-level signal PCLIP at the gate from the TG 113, the clipping MOS transistor 106 outputs the second reference signal VCLIPL to the column signal line 105 via its source at a timing when its drain receives the second reference signal VCLIPL.

In this way, before the first and second signals are output at different timings to the column signal lines, the reference signal supply units 114a and 114b on respective columns output the first reference signal VCLIPH and second reference signal VCLIPL to the column signal lines 105 at different timings.

Figure 3:
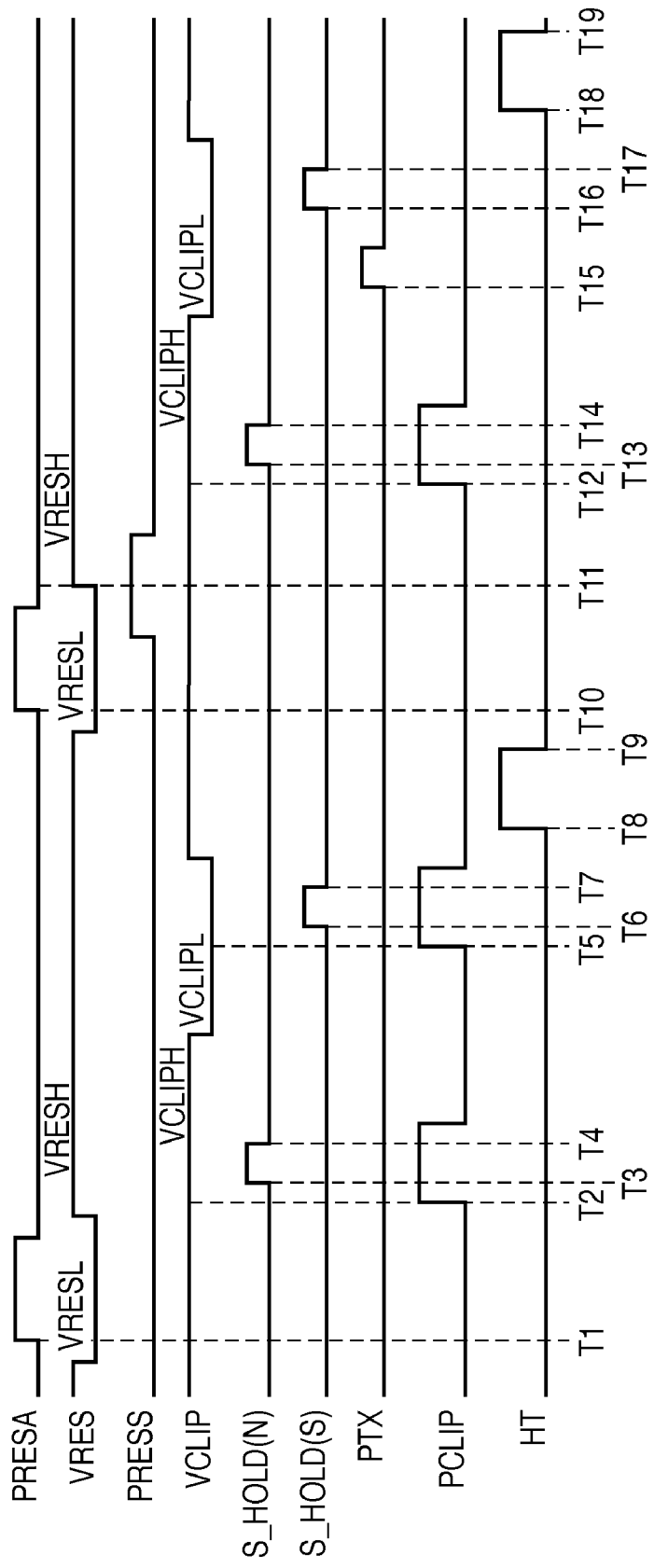
FIG. 3 is a timing chart showing the operation of the image sensing device 20.

The operation of the image sensing device 20 will be explained with reference to FIG. 3. FIG. 3 is a timing chart showing the operation of the image sensing device 20.

At timing T1, the vertical scanning circuit 112 changes a pulse PRESA to an active level, and supplies a pulse PRES (see FIG. 2), which is the logical addition of the pulse PRESA and a pulse PRESS, to the pixels P on all rows via reset control lines. In response to this, the reset units 102 in the pixels P on all the rows reset the charge-voltage conversion units 104 to the second potential VRESL, deselecting the pixels P on all the rows at once.

At timing T2, the TG 113 changes the pulse PCLIP to an active level. Then, the clipping MOS transistors 106 on the respective columns are turned on to output the first reference signal VCLIPH to the column signal lines 105. The column amplification units 115a and 115b on the respective columns receive the first reference signal VCLIPH.

At timing T3, the TG 113 changes a pulse S_HOLD(N) (see FIG. 2) to an active level. In response to this, the column amplification units 115a and 115b on the respective columns transfer, to the line memory 1151, the offsets of the column amplification units 115a and 115b on the respective columns as the first N signals of pixels on the respective columns.

At timing T4, the TG 113 changes the pulse S_HOLD(N) to a non-active level. The line memory 1151 holds the transferred first N signals of pixels on the respective columns.

At timing T5, the TG 113 changes the pulse PCLIP to an active level. Then, the clipping MOS transistors 106 on the respective columns are turned on to output the second reference signal VCLIPL to the column signal lines 105. The column amplification units 115a and 115b on the respective columns receive the second reference signal VCLIPL, and amplify the difference between the first reference signal VCLIPH and the second reference signal VCLIPL, thereby generating first image signals.

At timing T6, the TG 113 changes a pulse S_HOLD(S) to an active level. The column amplification units 115a and 115b on the respective columns transfer, to the line memory 1151, the first S signals of pixels on the respective columns that are obtained by superposing the offsets of the column amplification units 115a and 115b on the first image signals.

At timing T7, the TG 113 changes the pulse S_HOLD(S) to a non-active level. The line memory 1151 holds the transferred first S signals of pixels on the respective columns.

During an interval between timing T8 and timing T9, the horizontal scanning circuit 116 sequentially changes a horizontal transfer signal HT of each column to an active level. Then, the horizontal scanning circuit 116 sequentially transfers, to the output circuit 131, the first S signal and first N signal of the pixel on each column that are held in the line memory 1151 of the pixel signal readout circuit 115. The output circuit 131 calculates the difference between the transferred first S and N signals, obtaining a first image signal free from the offset of the column amplification unit. The output circuit 131 outputs the first image signal to the AFE 117.

The AFE 117 receives the first image signal from the image sensing device 20. The AFE 117 performs predetermined processing such as amplification processing for the first image signal, outputting the processed first image signal to the ADC 118.

The ADC 118 receives the first image signal from the AFE 117. The ADC 118 A/D-converts the received first image signal (analog signal), generating a first image signal (digital signal). The ADC 118 outputs the generated first image signal (digital signal) to the output processing circuit 119.

The output processing circuit 119 receives the first image signal (digital signal) from the ADC 118. The output processing circuit 119 executes various arithmetic processes such as correction for the first image signal (digital signal), generating reference image data. The output processing circuit 119 determines the amplification factors of the column amplification units 115a and 115b in accordance with the reference image data so as to reduce variations of the amplification factor between the column amplification units 115a and 115b.

Figure 4:
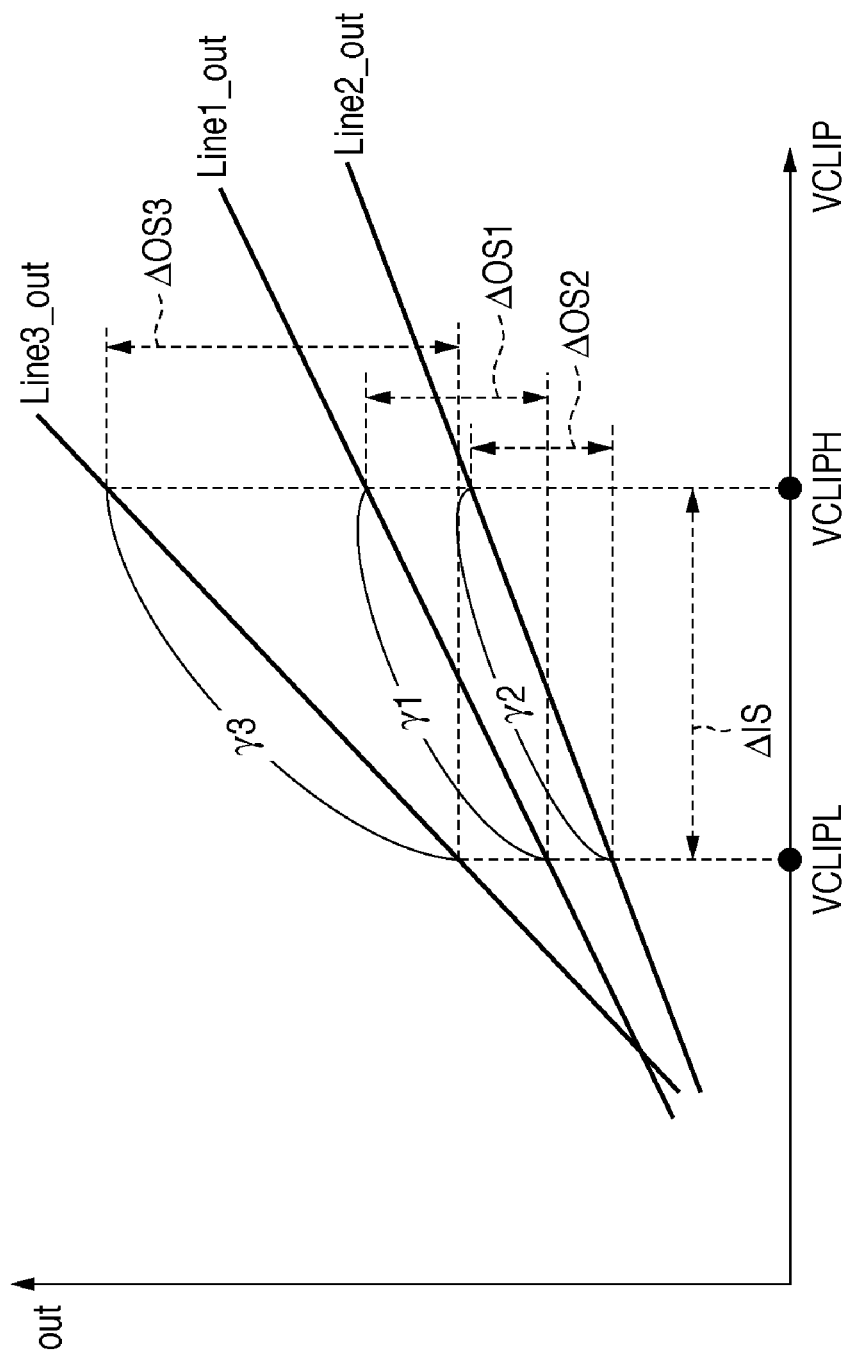
FIG. 4 is a graph for explaining a method of reducing variations between column amplification units on respective columns.

Assume that the pixel array includes 2×3 pixels. In this case, as shown in FIG. 4, the levels of the first reference signal VCLIPH and second reference signal VCLIPL are common to a plurality of columns Line1 to Line3. More specifically, a signal input to the column amplification unit is $\Delta IS$ common to a plurality of columns. Variations of the amplification factor between a plurality of column amplification units can be known by monitoring output signals $\Delta OS1$ to $\Delta OS3$ from column amplification units on the columns Line1 to Line3. The amplification factor of the column amplification unit on the first column Line1 is determined by $$\gamma 1 = (\Delta OS1)/(\Delta IS)$$

The amplification factor of the column amplification unit on the second column Line2 is determined by $$\gamma 2 = (\Delta OS2)/(\Delta IS) \quad (2)$$

The amplification factor of the column amplification unit on the third column Line3 is determined by $$\gamma 3 = (\Delta OS3)/(\Delta IS) \quad (3)$$

Coefficients for setting the amplification factors of the column amplification units on the columns Line1 to Line3 so as to reduce variations of the amplification factor between the column amplification units are determined as follows. More specifically, the coefficient for the column amplification unit on the first column Line1 is determined by $$K1 = \gamma 1/\gamma 1 = 1 \quad (4)$$

The coefficient for the column amplification unit on the second column Line2 is determined by $$K2 = \gamma 1/\gamma 2 \quad (5)$$

The coefficient for the column amplification unit on the third column Line3 is determined by $$K3 = \gamma 1/\gamma 3 \quad (6)$$

The output processing circuit 119 supplies, for example, the coefficients for setting amplification factors as information on the determined amplification factors to the overall control/arithmetic unit 120.

The overall control/arithmetic unit 120 receives the information on the determined amplification factors from the output processing circuit 119. The overall control/arithmetic unit 120 controls the TG 113 in accordance with the determined amplification factors.

The TG 113 supplies driving signals to the vertical scanning circuit 112, the correction signal, the output circuit 114, the pixel signal readout circuit 115, and the horizontal scanning circuit 116 in the image sensing device 20 under the control of the overall control/arithmetic unit 120.

For example, the TG 113 supplies driving signals associated with the determined amplification factors to the column amplification units 115a and 115b on the respective columns. The driving signals associated with the determined amplification factors are, for example, driving signals representing the coefficients for setting the amplification factors. In accordance with the driving signal, the setting unit 1092 of the column amplification unit 115a on the column sets the determined amplification factor as the amplification factor of the column amplification unit 115a.

At timing T10, the vertical scanning circuit 112 changes the pulse PRESA to an active level, and supplies the pulse PRES, which is the logical addition of the pulses PRESA and PRESS, to the pixels P on all the rows via the reset control lines. In response to this, the reset units 102 in the pixels P on all the rows reset the charge-voltage conversion units 104 to the second potential VRESL, deselecting the pixels P on all the rows at once.

At timing T11, the vertical scanning circuit 112 has changed the pulse PRESA to a non-active level, and has changed the pulse PRESS to an active level for a row to be selected, thereby supplying the active-level pulse PRES to only pixels on the row. In only the pixels P on the selected row, the reset units 102 reset the charge-voltage conversion units 104 to the first potential VRESH, selecting only the pixels P on the selected row. In the selected pixels P, the output units 103 output first signals (noise signals) to the column signal lines 105. Then, the column amplification units 115a and 115b on the respective columns receive the first signals.

At timing T12, the TG 113 changes the pulse PCLIP to a predetermined clipping level (first reference signal VCLIPH+ threshold voltage).

The level of the column signal line 105 sometimes becomes lower than the clipping level.

For example, when the object field contains a very bright object such as the sun, strong light may strike even the charge-voltage conversion units 104 in pixels on which the object image is formed. The charge-voltage conversion unit 104 is generally shielded from light. However, due to leakage of light and leakage of charge from the photoelectric conversion unit 100, potential fluctuations after reset cannot be completely prevented. For this reason, when very strong light enters a pixel, the level of the first signal (noise signal) varies from black level to come close to white level, narrowing the dynamic range of the signal. As a result, a bright light image darkening phenomenon, in which the level of an image signal from the pixel receiving strong light drops to black level, occurs.

For example, when the sun is sensed, in the sensed image, the center of the sun appears as a black point, resulting in an unnatural image. This problem can be solved for a still image by arranging a mechanical shutter between an object and the photoelectric conversion unit. However, most low-cost cameras omit the mechanical shutter, and cannot prevent the bright light image darkening phenomenon of a still image in still image sensing.

In moving image sensing, the use of the mechanical shutter is disadvantageous for ensuring an appropriate exposure time and frame rate. Thus, mechanical shutters are almost never used for sensing moving images, and, accordingly, cannot prevent the bright light image darkening phenomenon of a moving image in moving image sensing.

To solve this problem, according to the present embodiment, when the level of the column signal line 105 is lower than the clipping level, the clipping MOS transistor 106 on each column is turned on. When the level of the column signal line 105 is higher than the clipping level, the clipping MOS transistor 106 on each column remains off.

More specifically, the clipping MOS transistor 106 compares the first signal with the first reference signal VCLIPH. In accordance with the comparison result, the clipping MOS transistor 106 on each column outputs the first reference signal VCLIPH to the column signal line 105 to replace the first signal output to the column signal line 105 with the first reference signal VCLIPH. When the first reference signal VCLIPH is output to the column signal line 105, the column amplification unit 115a or 115b on each column receives the first reference signal VCLIPH instead of the first signal.

At timing T13, the TG 113 changes the pulse S_HOLD(N) to an active level. In response to this, the column amplification units 115a and 115b on the respective columns transfer, to the line memory 1151, the offsets of the column amplification units 115a and 115b on the respective columns as the second N signals of pixels on the respective columns.

At timing T14, the TG 113 changes the pulse S_HOLD(N) to a non-active level. The line memory 1151 holds the transferred second N signals of pixels on the respective columns.

At timing T15, the vertical scanning circuit 112 changes a transfer signal PTX to an active level for the selected row. In the selected pixels P, the transfer units 101 transfer the charges of the photoelectric conversion units 100 to the charge-voltage conversion units 104, and the output units 103 output the second signals (optical signals) to the column signal lines 105. Then, the column amplification units 115a and 115b on the respective columns receive the second signals.

When the level of the column signal line 105 is higher than the clipping level at timing T12, the column amplification units 115a and 115b on the respective columns generate second image signals by amplifying the differences between the first and second signals.

In contrast, when the level of the column signal line 105 is lower than the clipping level at timing T12, the column amplification units 115a and 115b on the respective columns generate second image signals by amplifying the differences between the first reference signal VCLIPH and the second signals. In this case, the column amplification units 115a and 115b perform CDS processing using the first reference signal VCLIPH as a noise signal. This can prevent the level of the second image signal from dropping to black level, that is, this can prevent the bright light image darkening phenomenon.

In either case, the column amplification units 115a and 115b on the respective columns generate second image signals by amplifying the difference between two signals at an amplification factor which is determined in accordance with the first image signal so as to reduce variations of the amplification factor between the column amplification units.

At timing T16, the TG 113 changes the pulse S_HOLD(S) to an active level. The column amplification units 115a and 115b on the respective columns transfer, to the line memory 1151, the second S signals of pixels on the respective columns that are obtained by superposing the offsets of the column amplification units 115a and 115b on the second image signals.

At timing T17, the TG 113 changes the pulse S_HOLD(S) to a non-active level. The line memory 1151 holds the transferred second S signals of pixels on the respective columns.

During an interval between timing T18 and timing T19, the horizontal scanning circuit 116 sequentially changes the horizontal transfer signals HT of the respective columns to an active level. Then, the horizontal scanning circuit 116 sequentially transfers, to the output circuit 131, the second S signal and second N signal of the pixel on each column that are held in the line memory 1151 of the pixel signal readout circuit 115. The output circuit 131 calculates the difference between the transferred second S and N signals, obtaining a second image signal free from the offset of the column amplification unit (operational amplifier). The output circuit 131 outputs the second image signal to the AFE 117.

The AFE 117 receives the second image signal from the image sensing device 20. The AFE 117 performs predetermined processes such as amplification processing and OB clamp processing for the second image signal. In the OB clamp processing, the AFE 117 uses a signal output from a pixel in the light-shielded region SA to correct the black level of a signal output from a pixel in the effective region EA. The AFE 117 outputs the processed second image signal to the ADC 118.

The ADC 118 receives the second image signal from the AFE 117. The ADC 118 A/D-converts the received second image signal (analog signal), generating a second image signal (digital signal). The ADC 118 outputs the generated second image signal (digital signal) to the output processing circuit 119.

The output processing circuit 119 receives the second image signal (digital signal) from the ADC 118. The output processing circuit 119 performs various arithmetic processes such as correction for the second image signal (digital signal), generating display or recording image data. The output processing circuit 119 supplies the display or recording image data to the overall control/arithmetic unit 120.

The overall control/arithmetic unit 120 receives the display or recording image data from the output processing circuit 119. The overall control/arithmetic unit 120 performs control of the respective units in order to display an image corresponding to the display image data on a display unit (not shown). The overall control/arithmetic unit 120 performs control of the respective units to record the recording image data on a recording medium (not shown).

As described above, the embodiment can generate an image signal (second image signal) by amplifying the difference between the first and second signals at an amplification factor which is determined in accordance with the first image signal so as to reduce variations of the amplification factor between a plurality of column amplification units. The embodiment can prevent variations in the levels of image signals output from the column amplification units 115a and 115b between columns, and reduce fixed pattern noise arising from variations of the amplification factor between a plurality of column amplification units. As a result, the embodiment can prevent streak noise in an image obtained from the image signal (second image signal).

It should be noted that, in the imaging system, for example, the AFE 117 outside the image sensing device 20 may also perform CDS processing to calculate the difference between N and S signals.

In this case, each of the column amplification units amplifies the first and second reference signals, and outputs the amplified first and second reference signals to the AFE 117 via the line memory and output circuit. The AFE 117 calculates the difference between the output amplified first and second reference signals, generating a first image signal. Each of the column amplification units amplifies the first and second signals at a determined amplification factor, and outputs the amplified first and second signals to the AFE 117 via the line memory and output circuit. The AFE 117 calculates the difference between the amplified first and second signals output from each column amplification unit, generating a second image signal.

Even in this case, variations of the amplification factor between a plurality of column amplification units on respective columns can be known in accordance with the levels of the first image signals on the respective columns. The amplification factor can be determined to reduce variations of the amplification factor between a plurality of column amplification units.

It should be noted that, instead of arranging the light-shielded region SA in the pixel array, a light-shielded image signal obtained by sensing an object while shielding each pixel of the pixel array from light by the stop may also be read out before actual photographing, and used as a black-level reference signal. In this case, the area of the pixel array can be reduced by the light-shielded region SA, downsizing the chip of the image sensing device 20.

When giving priority to the readout speed, the light-shielded region SA can be arranged in the pixel array, like the above-described embodiment.

The image sensing device 20, the TG 113, the AFE 117, the ADC 118, and the output processing circuit 119 may also be arranged on a single chip.

FIG. 5 shows another example of the imaging system to which the image sensing device 20 is applied. FIG. 5 is a block diagram showing another example of the arrangement of an imaging system S2 according to the embodiment of the present invention.

As shown in FIG. 5, the imaging system S2 mainly includes an optical system, the image sensing device 20, and a signal processing unit. The optical system mainly includes a shutter 91, a lens 92, and a stop 93. The signal processing unit mainly includes a sensed signal processing circuit (AFE) 95, an A/D converter (ADC) 96, an image signal processor (output processing circuit) 97, a memory 87, an external I/F 89, a timing generator (TG) 98, an overall control/arithmetic unit 99, a recording medium 88, and a recording medium control I/F 94. The signal processing unit may not include the recording medium 88.

The shutter 91 is arranged in front of the lens 92 on the optical path to control the exposure. The shutter 91 has both a function of protecting the lens 92 and a main switch function.

The lens 92 refracts incident light to form an object image on the pixel array (image sensing surface) of the image sensing device 20.

The stop 93 is interposed between the lens 92 and the image sensing device 20 on the optical path. The stop 93 adjusts the quantity of light guided to the image sensing device 20 after passing through the lens 92.

The image sensing device 20 converts an object image formed on the pixel array into an image signal. The image sensing device 20 reads out the image signal from the pixel array, and outputs it.

The sensed signal processing circuit 95 is connected to the image sensing device 20, and performs processes such as amplification processing and OB clamp processing for an image signal output from the image sensing device 20.

The A/D converter 96 is connected to the sensed signal processing circuit 95. The A/D converter 96 converts a processed image signal (analog signal) output from the sensed signal processing circuit 95 into a digital signal.

The image signal processor 97 is connected to the A/D converter 96. The image signal processor 97 performs various arithmetic processes such as correction for an image signal (digital signal) output from the A/D converter 96, generating image data. The image signal processor 97 supplies the image data to the memory 87, the external I/F 89, the overall control/arithmetic unit 99, the recording medium control I/F 94, and the like.

The memory 87 is connected to the image signal processor 97, and temporarily stores image data output from the image signal processor 97.

The external I/F 89 is connected to the image signal processor 97. Image data output from the image signal processor 97 is transferred to an external device (e.g., personal computer) via the external I/F 89. This allows the user to process an image via the external device (e.g., personal computer).

The timing generator 98 is connected to the image sensing device 20, sensed signal processing circuit 95, A/D converter 96, and image signal processor 97. The timing generator 98 supplies timing signals to the image sensing device 20, sensed signal processing circuit 95, the A/D converter 96, and the image signal processor 97. The image sensing device 20, the sensed signal processing circuit 95, the A/D converter 96, and the image signal processor 97 operate in synchronism with the timing signals.

The sensed signal processing circuit 95, the A/D converter 96, the image signal processor 97, and the timing generator 98 may also be formed on the same chip as that of the image sensing device 20.

The overall control/arithmetic unit 99 is connected to the timing generator 98, image signal processor 97, and recording medium control I/F 94, and controls all of them.

For example, the overall control/arithmetic unit 99 performs photometry based on image data received from the image signal processor 97. The overall control/arithmetic unit 99 adjusts the opening degree of the stop 93 and the charge storage time of each pixel in the image sensing device 20 in accordance with the photometry result to obtain a correct exposure value.

For example, the overall control/arithmetic unit 99 performs focus adjustment based on image data received from the image signal processor 97. The overall control/arithmetic unit 99 drives and controls the lens 92 in accordance with the focus adjustment result so as to attain an in-focus state.

The recording medium 88 is detachably connected to the recording medium control I/F 94. Image data output from the image signal processor 97 is recorded on the recording medium 88 via the recording medium control I/F 94. The recording medium 88 is formed from a semiconductor memory or the like.

With this arrangement, the image sensing device 20 can provide a high-quality image (image data) as long as it can obtain a high-quality image signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-148315, filed Jun. 5, 2008 which is hereby incorporated by reference herein in its entirety.

What is claimed is:

1. An image sensing device comprising:
   a pixel array in which a plurality of pixels are arrayed in a direction along a row and a direction along a column;
   a plurality of column amplification units, each of which includes a setting unit that sets an amplification factor therefor, and each of which amplifies, by the amplification factor set by the setting unit, the difference between a first signal and a second signal output at different timings from a pixel on a column in the pixel array to a column signal line or amplifies, by the set amplification factor, each of the first signal and the second signal; and
   a plurality of reference signal supply units, each of which outputs a first reference signal and a second reference signal to the column signal line at different timings,
   wherein the first reference signal and the second reference signal are common to a plurality of columns in the pixel array,
   wherein each of the plurality of column amplification units amplifies the difference between the first reference signal and the second reference signal to output the amplified difference, or amplifies each of the first reference signal and the second reference signal to output each of the amplified first reference signal and the amplified second reference signal, and
   wherein each setting unit sets an amplification factor for its column amplification unit, that is determined in accordance with a signal output from each of the plurality of column amplification units so as to reduce the variations between the amplification factors of the plurality of column amplification units.

2. The device according to claim 1, wherein
   each of the plurality of column amplification units amplifies the difference between the first reference signal and the second reference signal to generate and output a first image signal,
   each setting unit sets, in its column amplification unit, an amplification factor which is determined in accordance with the first image signals of the plurality of column amplification units so as to reduce variations between the amplification factors of the plurality of column amplification units, and
   each of the plurality of column amplification units amplifies the difference between the first signal and the second signal at the amplification factor set by the setting unit to generate and output a second image signal.

3. The device according to claim 2, wherein
   each of the plurality of column amplification units includes
      an operational amplifier having an input terminal and an output terminal,
      an input capacitor including a first electrode and a second electrode, the first electrode receiving a signal transferred via the column signal line from either of a pixel on each column in the pixel array and the reference signal supply unit, and the second electrode being connected to the input terminal of the operational amplifier,
      a feedback capacitor connected to the input terminal and output terminal of the operational amplifier, and the feedback capacitor having a variable capacitance value, and
      a reset switch being connected to the input terminal and output terminal of the operational amplifier, and the reset switch resetting the operational amplifier, and
   wherein each setting unit controls the feedback capacitance of its column amplification unit to a capacitance value corresponding to the amplification factor of its column amplification unit which is determined in accordance with the first image signal so as to reduce variations between the amplification factors of the plurality of column amplification units.

4. The device according to claim 1, wherein
   each of the plurality of column amplification units amplifies the first reference signal and the second reference signal to output the amplified first reference signal and the amplified second reference signal,
   each setting unit sets, in its column amplification unit, an amplification factor which is determined in accordance with the amplified first reference signal and the amplified second reference signal so as to reduce variations between the amplification factors of the plurality of column amplification units, and
   each of the plurality of column amplification units amplifies the first signal and the second signal at the amplification factor set by its setting unit to output the amplified first signal and the amplified second signal.

5. The device according to claim 4, wherein
   each of the plurality of column amplification units includes
      an amplifier which receives a signal transferred from either of a pixel on each column in the pixel array and the reference signal supply unit via the column signal line, and
      each setting unit sets, in the amplifier of its column amplification unit, an amplification factor which is determined in accordance with the amplified first reference signal and the amplified second reference signal so as to reduce variations between the amplification factors of the plurality of column amplification units.

6. An imaging system comprising:

an image sensing device defined in claim 1;

an optical system which forms an image on an image sensing surface of the image sensing device; and a signal processing unit which processes a signal output from the image sensing device to generate image data, wherein each of the plurality of column amplification units amplifies the difference between the first reference signal and the second reference signal to generate and output a first image signal, wherein the signal processing unit controls each setting unit to receive the first image signal, determine an amplification factor of its column amplification unit in accordance with the received first image signals so as to reduce variations between the amplification factors of the plurality of column amplification units, and set the determined amplification factor, and wherein each of the plurality of column amplification units amplifies the difference between the first reference signal and the second reference signal at the amplification factor set by its setting unit under the control of the signal processing unit to generate and output a second image signal.

7. An imaging system comprising:

an image sensing device defined in claim 1;

an optical system which forms an image on an image sensing surface of the image sensing device; and a signal processing unit which processes a signal output from the image sensing device to generate image data, wherein each of the plurality of column amplification units amplifies the first reference signal and the second reference signal to output the amplified first reference signal and the amplified second reference signal, wherein the signal processing unit receives the amplified first reference signal and the amplified second reference signal of each column amplification unit, generates a first image signal of each column amplification unit by calculating the difference between the received amplified first reference signal and the received amplified second reference signal of that column amplification unit, determines an amplification factor of each of the plurality of column amplification units in accordance with the generated first image signal thereof so as to reduce variations between the amplification factors of the plurality of column amplification units, and controls each setting unit to set the determined amplification factor, wherein each of the plurality of column amplification units amplifies the first signal and the second signal at the amplification factor set by its setting unit under the control of the signal processing unit to output the amplified first signal and the amplified second signal, and wherein the signal processing unit receives the amplified first signal and the amplified second signal to calculate the difference between the amplified first signal and the amplified second signal to generate a second image signal.

* * * * *